United States Patent
Liu et al.

(10) Patent No.: US 8,203,916 B2
(45) Date of Patent: Jun. 19, 2012

(54) BUFFER MANAGEMENT METHOD AND APPARATUS THEREOF

(75) Inventors: Tun-Hsing Liu, Tao-Yuan Hsien (TW); Chih-Chuan Chen, Taipei County (TW); Kun-Chieh Yang, Tainan (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 629 days.

(21) Appl. No.: 12/206,706

(22) Filed: Sep. 8, 2008

(65) Prior Publication Data
US 2010/0061201 A1 Mar. 11, 2010

(51) Int. Cl.
*G11B 21/08* (2006.01)
(52) U.S. Cl. .................................. 369/30.23; 369/47.34
(58) Field of Classification Search ............... 369/30.23, 369/47.32, 47.33, 47.34, 47.14, 53.15, 53.17; 711/105, 111, 112, 113, 114, 147, 150, 153, 711/116
See application file for complete search history.

(56) References Cited

U.S. PATENT DOCUMENTS
5,133,060 A * 7/1992 Weber et al. .................. 711/113
2005/0240750 A1* 10/2005 Lin .............................. 711/203
* cited by examiner

*Primary Examiner* — Tan X Dinh
(74) *Attorney, Agent, or Firm* — Winston Hsu; Scott Margo

(57) ABSTRACT

A control unit accesses a memory. The memory includes a plurality of blocks. The control unit includes a batch buffer, a batch controller and a multiplexer. The batch buffer stores a batch which includes a designated block index. The batch controller fetches the designated block index from the batch buffer. The multiplexer selectively outputs a sequential block index or the designated block index as an active index according to a control signal. And a designated block of the memory is accessed according to the active index.

18 Claims, 11 Drawing Sheets

BUFFER MANAGEMENT METHOD AND APPARATUS THEREOF

BACKGROUND OF THE INVENTION

1. Field of the Invention

The invention relates to a method and apparatus for accessing a memory, and more particularly, to a method and apparatus for accessing a ring buffer memory.

2. Description of the Prior Art

Please refer to FIG. 1. FIG. 1 is an exemplary block diagram of an optical disc drive 10. The optical disc drive 10 comprises a pickup head 12, a servo controller 14, a write signal generating unit 16, a recorded data generating unit 18, an encoder 22, a decoder 24, a comparator 26 and a memory 28. The servo controller 14 drives the pickup head 12 to read or write data from or to an optical disc 20. The memory 28 stores data. The data stored in the memory 28 are encoded by the encoder 22 to form an encoded recording data. The write signal generating unit 16 receives the encoded recording data and outputs a write signal to the pickup head 12 for recording the data onto an optical disc 20.

The recorded data generating unit 18 receives a modulated recorded data signal from the pickup head 12 and generates an encoded recorded data. The encoded recorded data are decoded by the decoder 24 to output recorded data. The comparator 26 compares the recorded data with the data stored in the memory 28 to verify the correctness of the recorded data.

The memory 28, such as a ring buffer, is divided into multiple blocks. Each block serves as a basic unit for storing the data. The data are stored into the memory 28 block by block, and are outputted from the memory block by block. The data of each block of the memory 28 is to be recorded in a destination address of the optical disc 20. In general, the data to be recorded on sequential destination addresses will be sequentially stored in the adjacent blocks of the memory 28. Then, when recording the data, the data could be read out from the memory 28 in sequence, thereby the pickup head 12 of the optical disc drive 10 could sequentially move around the optical disc 20.

Sequentially read/write data from/to the optical disc is more efficiency for an optical disc drive. However, the data stored in successive blocks of the memory 28 may not have destination address information. Therefore, when the data stored in successive blocks are sequentially outputted from the memory 28, the optical disc drive 10 may frequently move the pickup head 12 back and forth around the surface of the optical disc 20. Thus the efficiency of the recording operating is limited.

For a recordable optical disc, a certain location on the recordable optical disc could be perceived as a "defect", caused by scratch, finger print, damage to the surface of the optical disc, or a change in the material characteristic of the optical disc. The specific location, i.e. defective part, corresponding to the defect cannot be utilized for storing data correctly. Therefore, the defect management is proposed in the optical disc specification. One of the most popular defect management provides a spare area on the optical disc. As a result, when a defective part is identified, the data that is originally to be recorded in the defective part will be recoded into the spare area of the optical disc. Thus, the recording function of the optical disc will not be influenced by the defect.

Please refer to FIG. 2 to FIG. 4. FIG. 2 to FIG. 4 are schematic views of managing buffered data with respect to the defect management of the optical disc drive. As Shown in FIG. 1 and FIG. 2 the optical disc 20 comprises a data area and a spare area. The data stored in the memory 28 are successively recorded onto the destination addresses of the data area. If a defective part of the data area is identified, the data that is originally designed to be recorded in the defective part will be further recoded onto the spare area. Please refer to FIG. 1 and FIG. 3. In order to support the defect management and also maintain the recording efficiency, the memory 28 of the optical disc drive comprises a main buffer 281 and a second buffer 282. The data are initially stored in the main buffer 281. When defective part of the data area is identified, the data of the defective parts are stored in the second buffer 282 for the sake of sequentially recording the data of the defective part onto the spare area. The write signal generating unit 16 generates the write signal according the data received from the main buffer 281, and outputs the write signal to the pickup head 12. So that the pickup head 12 moves to the destination address of the data area and emits laser light according to the write signal to record the data to the data areas of the optical disc 20. In addition, the pickup head 12 moves to the spare area of the optical disc 20 and emits laser light to the spare area according to the write signal generated from the data stored in the second buffer 282.

As shown in FIG. 4, the data recorded on the optical disc 20 (i.e. recorded data) are verified to check the correctness of the recorded data by reading the recorded data to compare with the data stored in the memory 28. For the data recorded in the spare area, the optical disc drive 10 moves the pickup head 12 to the spare area, and then generates the recorded data. The comparator 26 compares the recorded data received from the recorded data generating unit 18 and the data stored in the second buffer 282 so as to verify the recording correctness.

SUMMARY OF THE INVENTION

The claimed invention provides a method for accessing a memory. The memory includes a plurality of blocks. The method comprises: providing a batch, wherein the batch comprises a designated block index; generating a sequential block index; selectively outputting the sequential block index or the designated block index as an active index according to a control signal; and accessing a designated block of the memory according to the active index.

The claimed invention further provides a control unit for accessing a memory. The memory comprises a plurality of blocks. The control unit comprises a batch buffer, a batch controller and a multiplexer. The batch buffer stores a batch which comprises a designated block index. The batch controller fetches the designated block index from the batch buffer. The multiplexer selectively outputs a sequential block index or the designated block index as an active index according to the control signal. And a designated block of the memory is accessed according to the active index.

The claimed invention further provides an optical disc drive. The optical disc comprises a batch unit, a memory, a write signal generating unit and a pickup head. The batch unit outputs a sequential block index or a designated block index as an active index. The memory comprises a plurality of blocks for storing data therein. A designated block of the memory is accessed according to the active index. The data stored in the designated block is outputted as a read data. The write signal generating unit generates a write signal according to the read data. And the pickup head, according to the write signal, records the read data to an optical disc.

Moreover, the claimed invention further provides an optical disc drive. The optical disc comprises a pickup head, a recorded data generating unit, a batch unit and a memory. The pickup head reads a recorded data from an optical disc to generate a modulated recorded data signal. The recorded data generating unit generates a recorded data according to the modulated recorded data signal. The batch unit outputs a sequential block index or a designated block index as an active index. And, the memory comprises a plurality of blocks for storing the recorded data into a designated block according to the active index.

These and other objectives of the invention will no doubt become obvious to those of ordinary skill in the art after reading the following detailed description of the preferred embodiment that is illustrated in the various figures and drawings.

DETAILED DESCRIPTION

Figure 1:
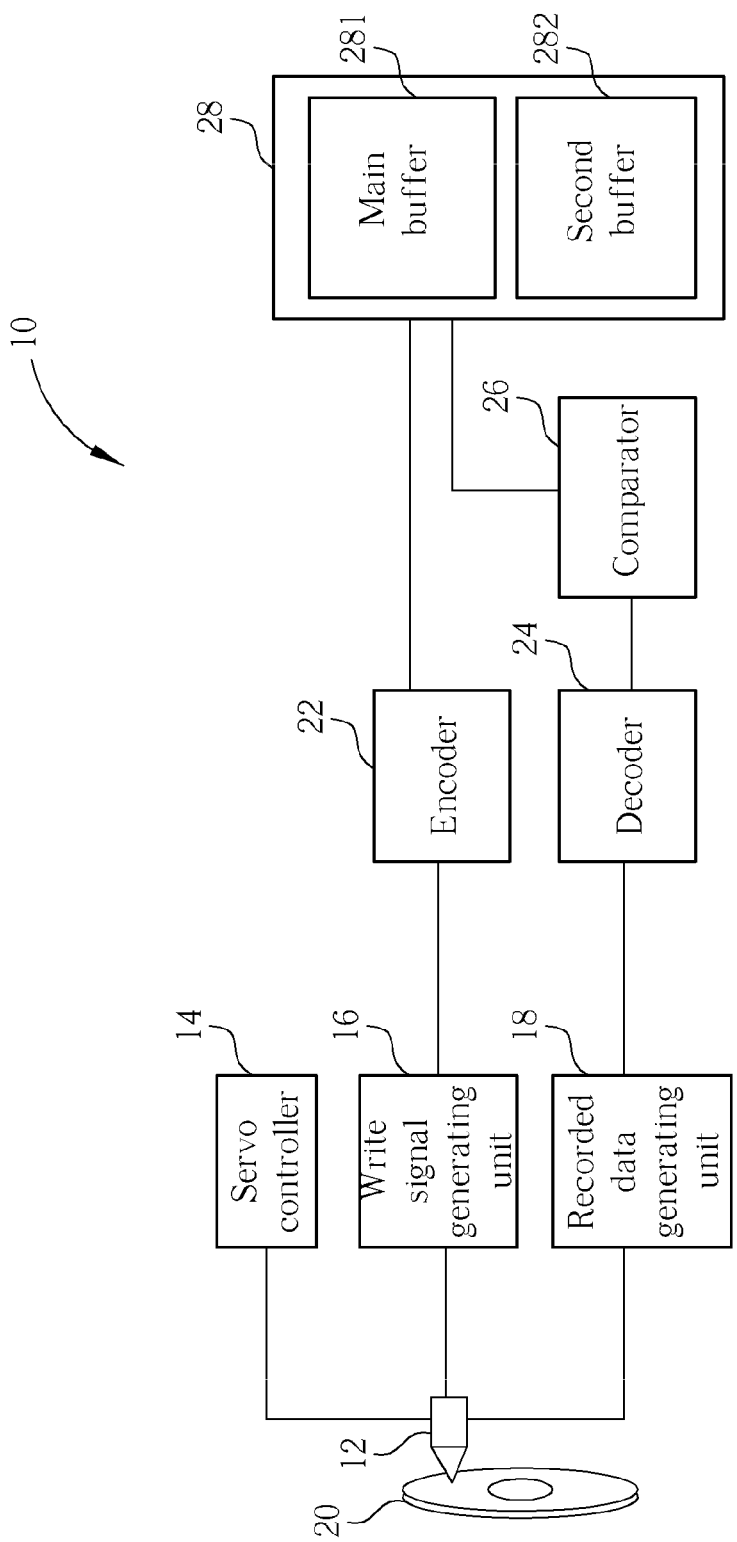
FIG. 1 is an exemplary block diagram of an optical disc.
Figure 2:
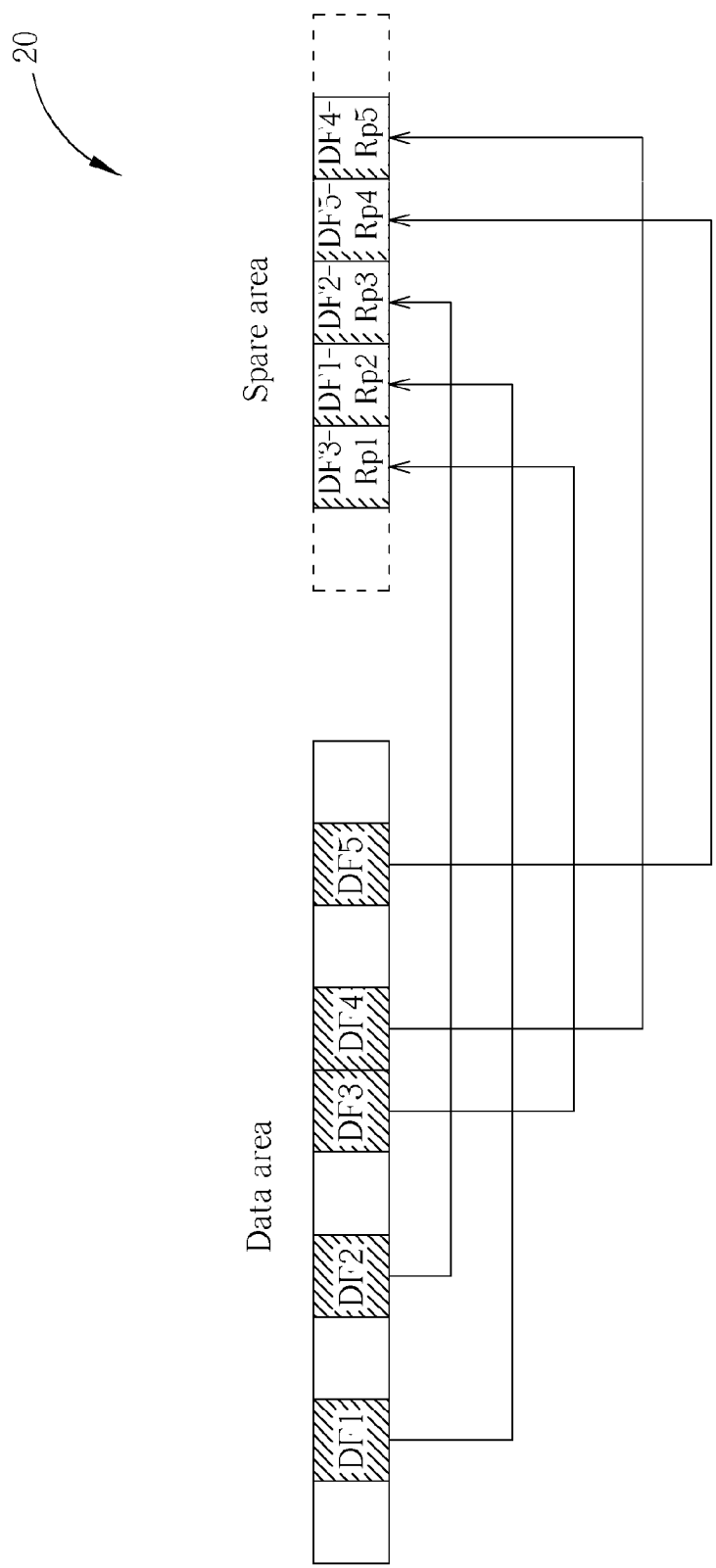
FIG. 2 to FIG. 4 are schematic views of processing buffered data with respect to the defect management of the optical disc drive.
Figure 3:
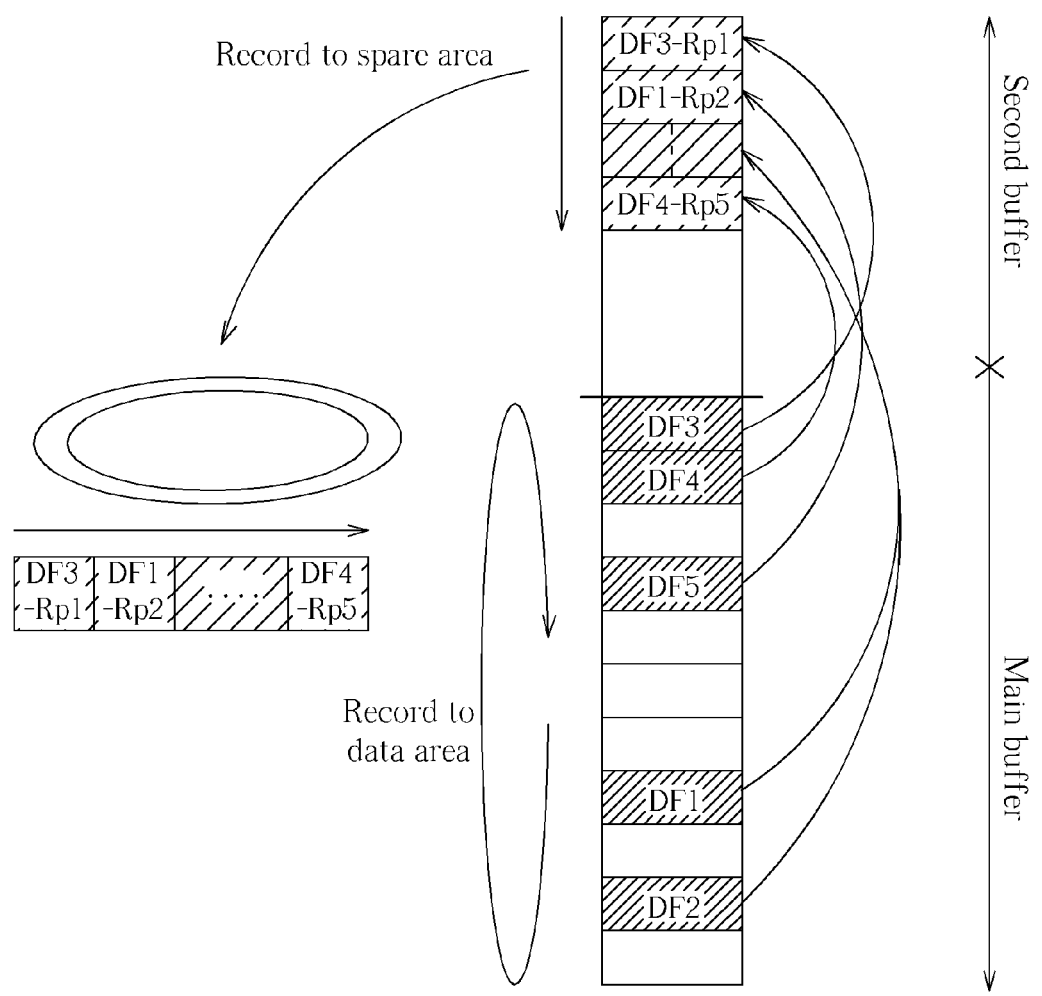
Figure 4:
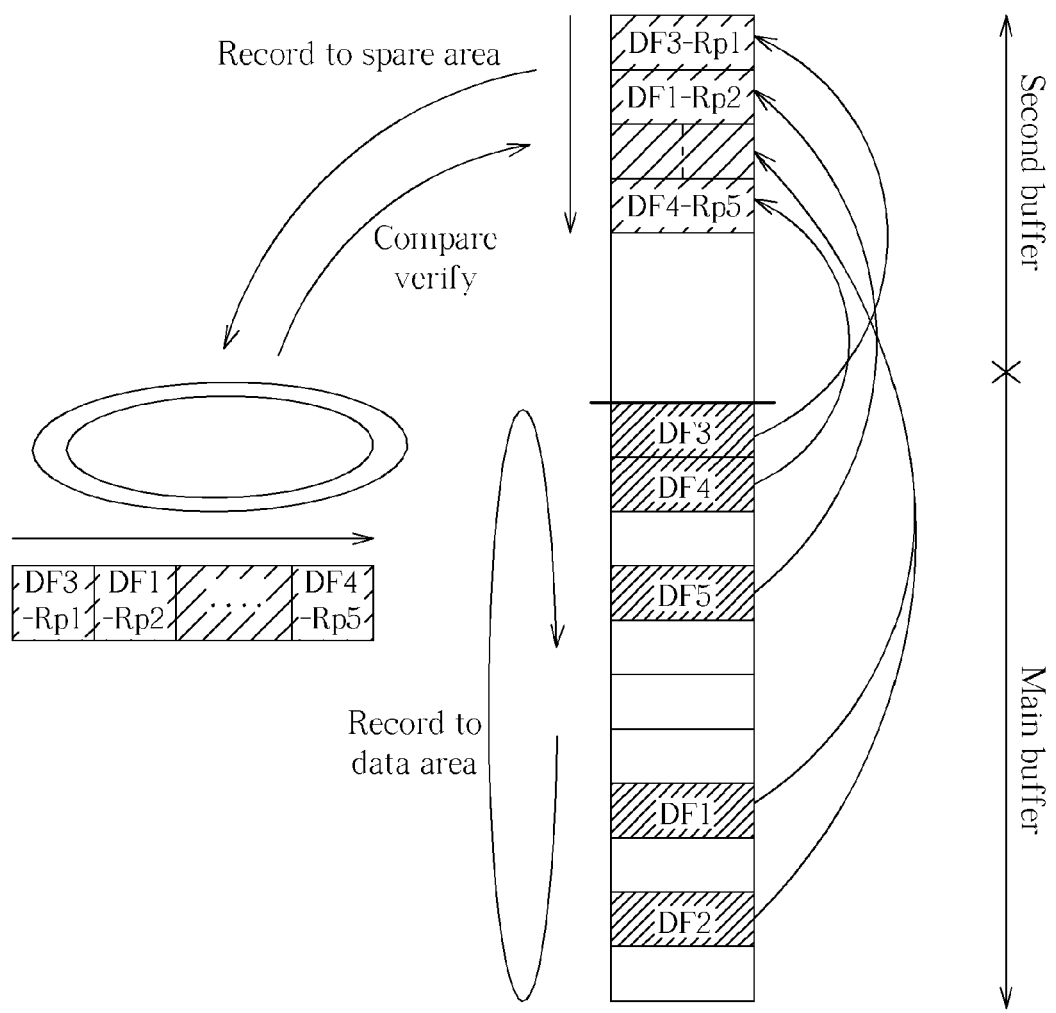
Figure 5:
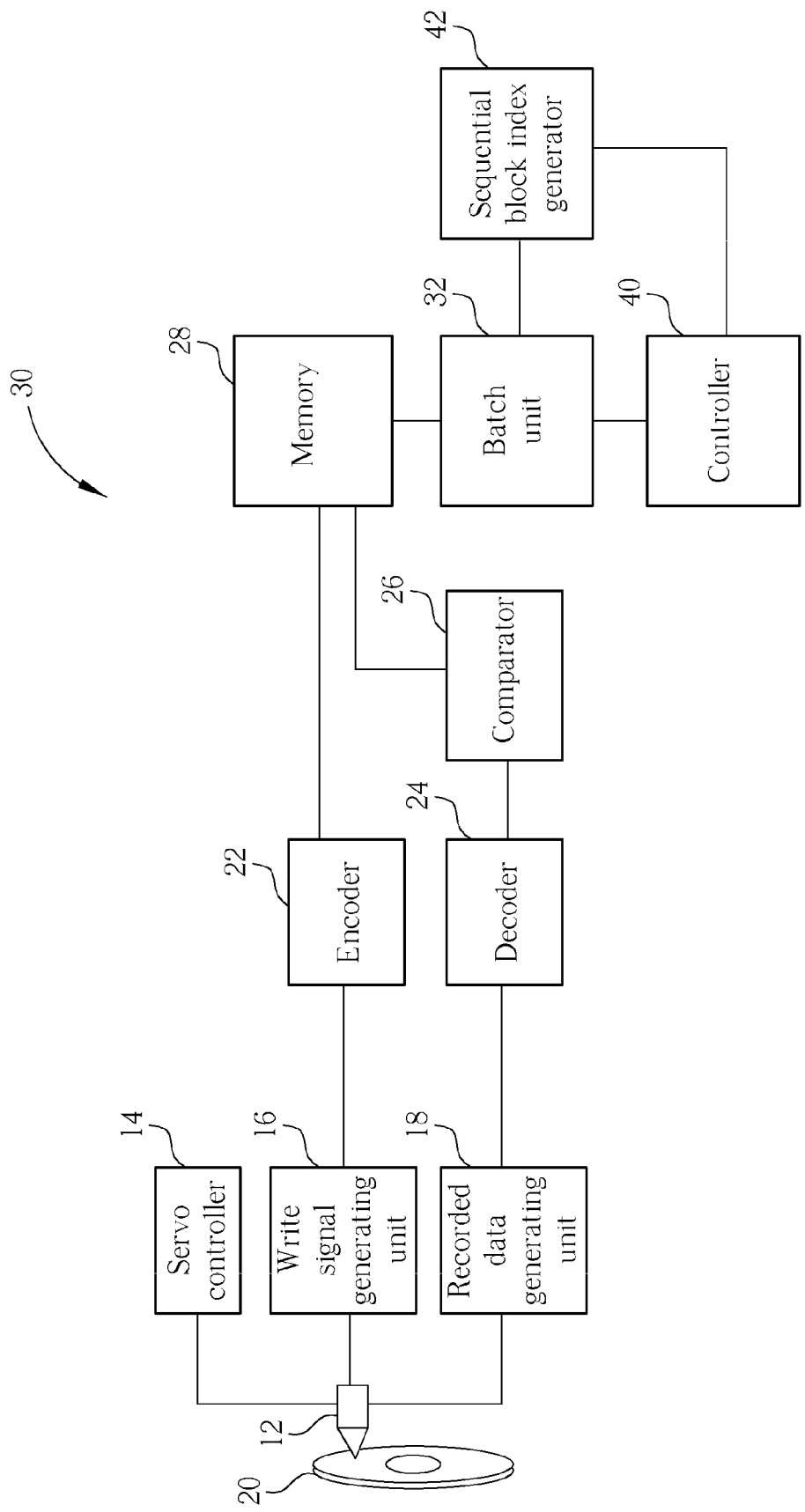
FIG. 5 is a block diagram of an optical disc drive according to the invention.

Please refer to FIG. 5. FIG. 5 is a block diagram of an optical disc drive 30 according to the invention. The optical disc drive 30 comprises a pickup head 12, a servo controller 14, a write signal generating unit 16, a recorded data generating unit 18, an encoder 22, a decoder 24, a comparator 26, a memory 28, a controller 40, a sequential block index generator 42 and a batch unit 32. The similar elements denoted as the same numerical have the similar function and structure as shown in FIG. 1. Therefore, the details are not described here for the sake of brevity.

The memory 28, for example a ring buffer, is divided into multiple blocks served as a basic unit for storing data. Each block is identified by a block index. The data stored in each block of the memory 28 having destination address information is to be recorded in a destination address of the optical disc 20. The destination address information could be a physical address or a logical address. In general, if a pointer (not shown) of the memory 28 indicates a specific block of the memory 28, the specific block indicated by the pointer could be accessed to perform storing data or reading data. While the pointer moves around blocks, the blocks successively indicated by the pointer are accessed to perform storing a write data or reading a read data. Therefore, the write data could be stored into the memory 28 block by block, and the read data could read out from the memory block by block. If a defective part on the optical disc 20 is found, and a specific destination address of the defective part is identified, the data which is originally to be recorded onto the defective part will be recorded into a replacement location of the spare area.

According to an embodiment of the invention, when the pickup head 12 records the read data outputted from the memory 28 to the optical disc 20, the batch unit 32 controls the memory 28 so as to output the read data with sequential destination address information. Therefore, the optical disc drive 30 sequentially moves the pickup head 12 to record the read data onto the optical disc 20 as a recorded data. Similarly, when verify the recorded data, the batch unit 32 controls the memory 28 so as to provide corresponding read data stored in the memory 28 for comparing by the comparator 26 to check the correctness of the recorded data. The controller 40 controls the batch unit 32 and the sequential block index generator 42. And the block index generator 42 generates a sequential block index.

Figure 6:
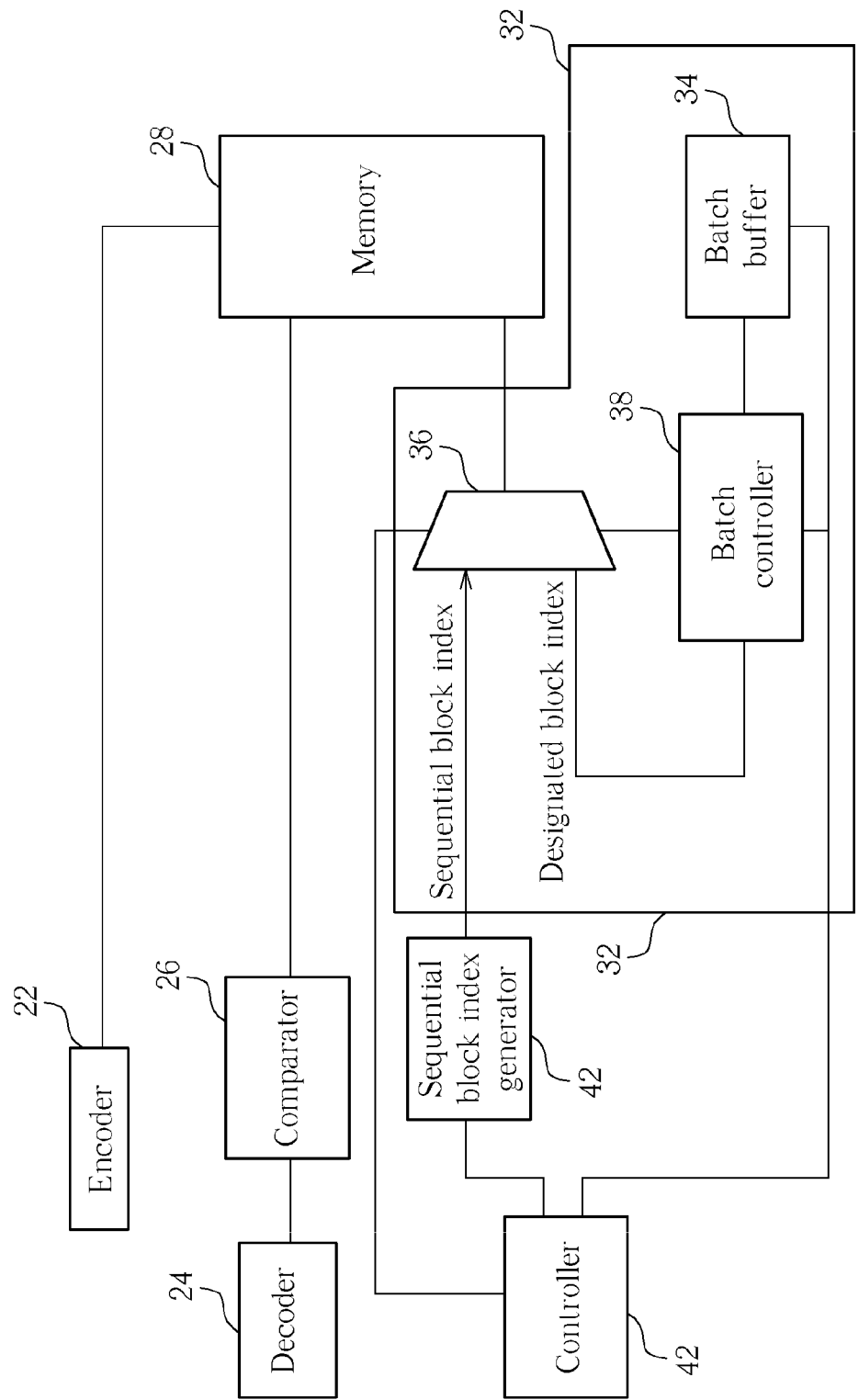
FIG. 6 is a block diagram of the batch unit in FIG. 5.

Please refer to FIG. 6. FIG. 6 is a block diagram of the batch unit 32 in FIG. 5. The batch unit 32 includes a batch buffer 34, a multiplexer 36, and a batch controller 38. The batch Buffer 34 stores a batch. The batch includes a plurality of designated block indexes arranged in series corresponding to a plurality of designated blocks in the memory 28. The multiplexer 36 is controlled by the controller 40 to selectively output a sequential block index or a designated block index as an active index corresponding to a specific block of the memory 28. The controller 40 also controls the batch control 38 to access the batch buffer 34 and to transfer the designated block index to the multiplexer 36. A sequential block index generator 42 generates the sequential block index to control the memory 28 to access the plurality blocks in a ring fashion. And the controller 40, according to the information of the defective parts on the optical disc 20, also generates the batch for controlling the memory 28 to output the data stored in the designated blocks thereby improving the efficiency of the optical disc drive 30.

Figure 7:
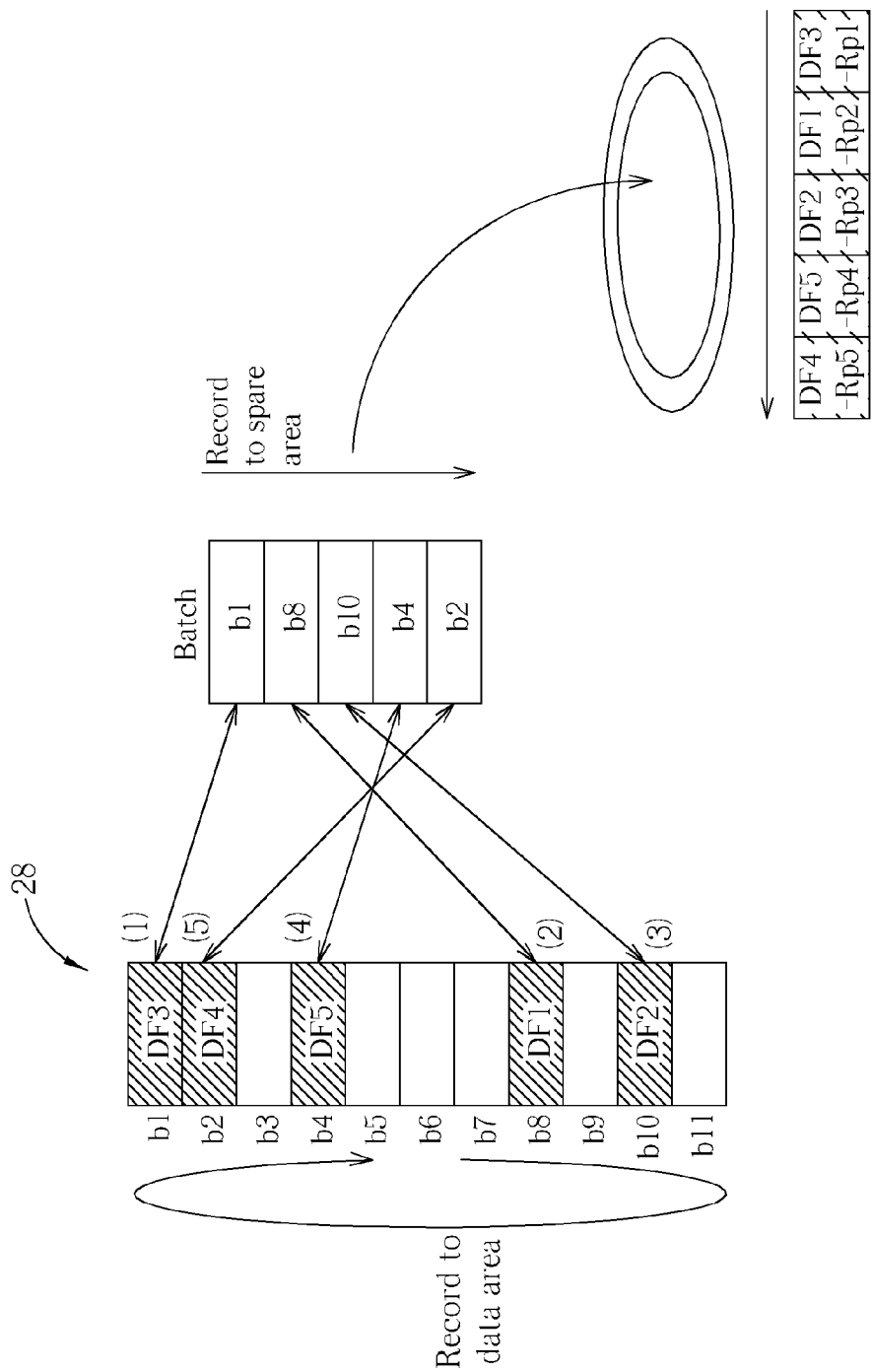
FIG. 7 and FIG. 8 are schematic view of the optical disc 20 with defect management according to the invention.
Figure 8:
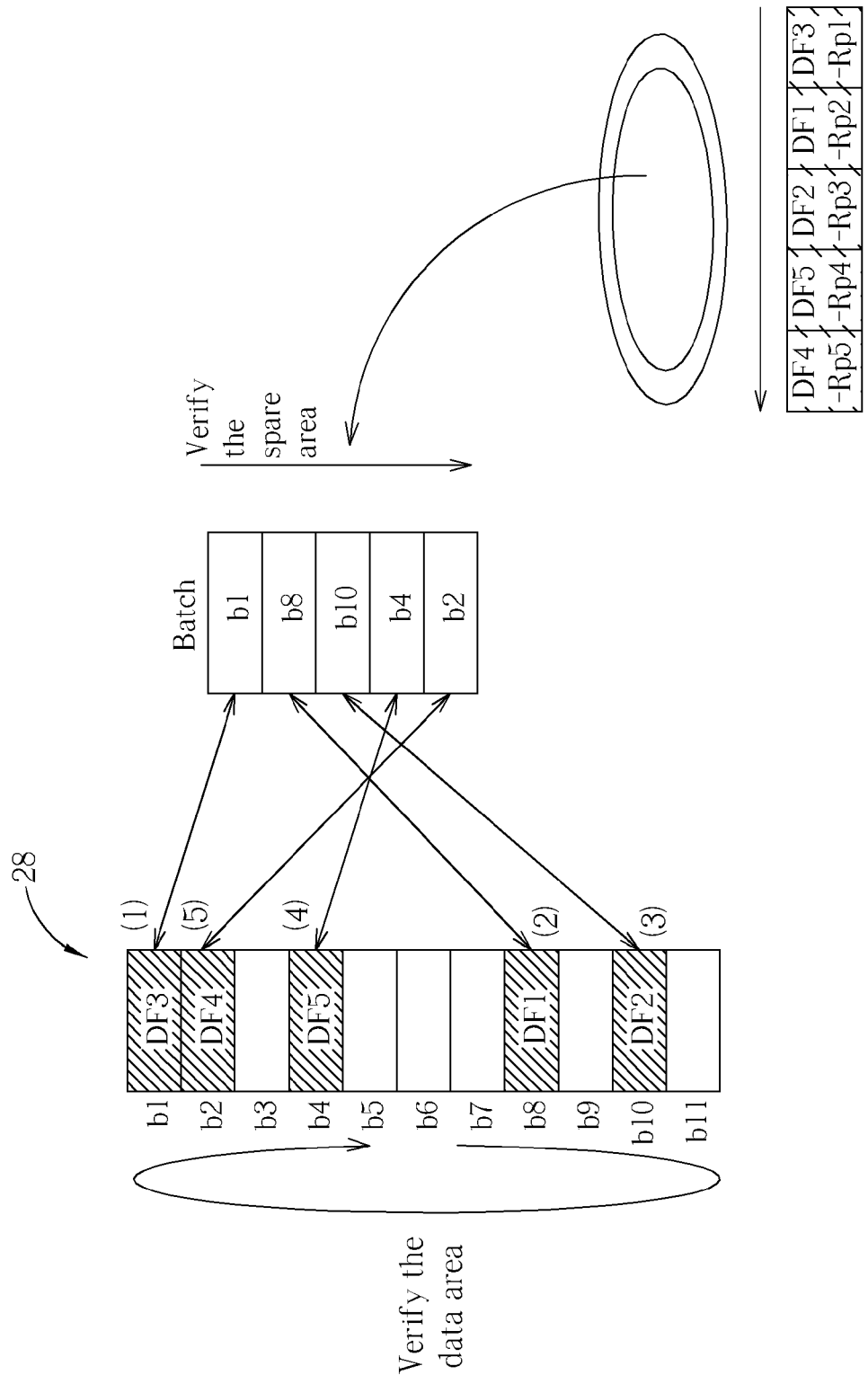

FIG. 7 and FIG. 8 are schematic views of the optical disc 20 with defect management according to the invention. The optical disc 20 includes data areas and spare areas. For example, if defective parts DF1-DF5 are identified in the data areas, the data that is originally to be recorded in the defective parts DF1-DF5 will be recoded into the spare area of the optical disc 20. Please refer to FIG. 6 and FIG. 7, when recording the read data outputted from the memory 28 to the data area, the controller 40 controls the multiplexer 36 outputting the sequential block index as the active index indicating a specific block of the memory 28. According to the active index, the data stored in the specific block (e.g. block b7 in FIG. 7) of the memory 28 are outputted as the read data to the encoder 22. If the data stored in successive blocks have sequential designation address information, the sequential block indexes successively generated from the sequential block index generator 42 will indicates the specific blocks in sequence and in a ring fashion, e.g. block b7 through block b11 then returns to block b1 through b6.

When recording the data to the spare area, the batch controller 38 access the batch buffer 34, and the controller 40 controls the multiplexer 36 outputting the designated block indexes as the active index which respectively indicates a plurality of specific blocks of the memory 28. According to the active index, the data stored in the specific blocks (e.g. blocks b1, b8, b10, b4 and then b2) of the memory 28 are sequentially outputted as the read data to the encoder 22. Thus, the optical disc drive 30 could record the read data of the defective parts to the spare area without an auxiliary buffer for storing the data. Therefore, the servo controller 14 could sequentially move the pickup head 12 around the optical disc 20 thereby to improve the recording efficiency of the optical disc drive 30.

The data written to the optical disc 20 should be verified by reading the recorded data to check the correctness. The recorded data, for example, are compared with the data stored in the memory 28. When verifying the recorded data recorded on the data area, the controller 40 controls the multiplexer 36 outputting the sequential block indexes as the active index which respectively indicates a plurality of specific blocks of the memory 28. According to the active index, the data stored in the specific blocks (e.g. block b7 through block b11 then returns to block b1 through b6) of the memory 28 are sequentially outputted as the read data to the comparator 26.

Please refer to FIG. 8, when verifying the recorded data recorded on the spare area, the batch controller 38 accesses the batch buffer 34, and the controller 40 controls the multiplexer 36 outputting the designated block indexes as the active index which respectively indicates a plurality of specific blocks of the memory 28. According to the active index, the data stored in the specific blocks (e.g. blocks b1, b8, b10, b4 and then b2) of the memory 28 are sequentially outputted as a read data to the comparator 26. Therefore, the servo controller 14 could sequentially move the pickup head 12 around the optical disc 20 thereby to improve the verifying efficiency of the optical disc drive 30.

In the embodiment of the invention, with the batch control, the optical disc drive could randomly access the memory, especially a ring buffer. Thus, the pickup head of the optical disc drive could move sequentially to record, verify, or read the data of the optical disc with the defect management without the auxiliary buffer.

Figure 9:
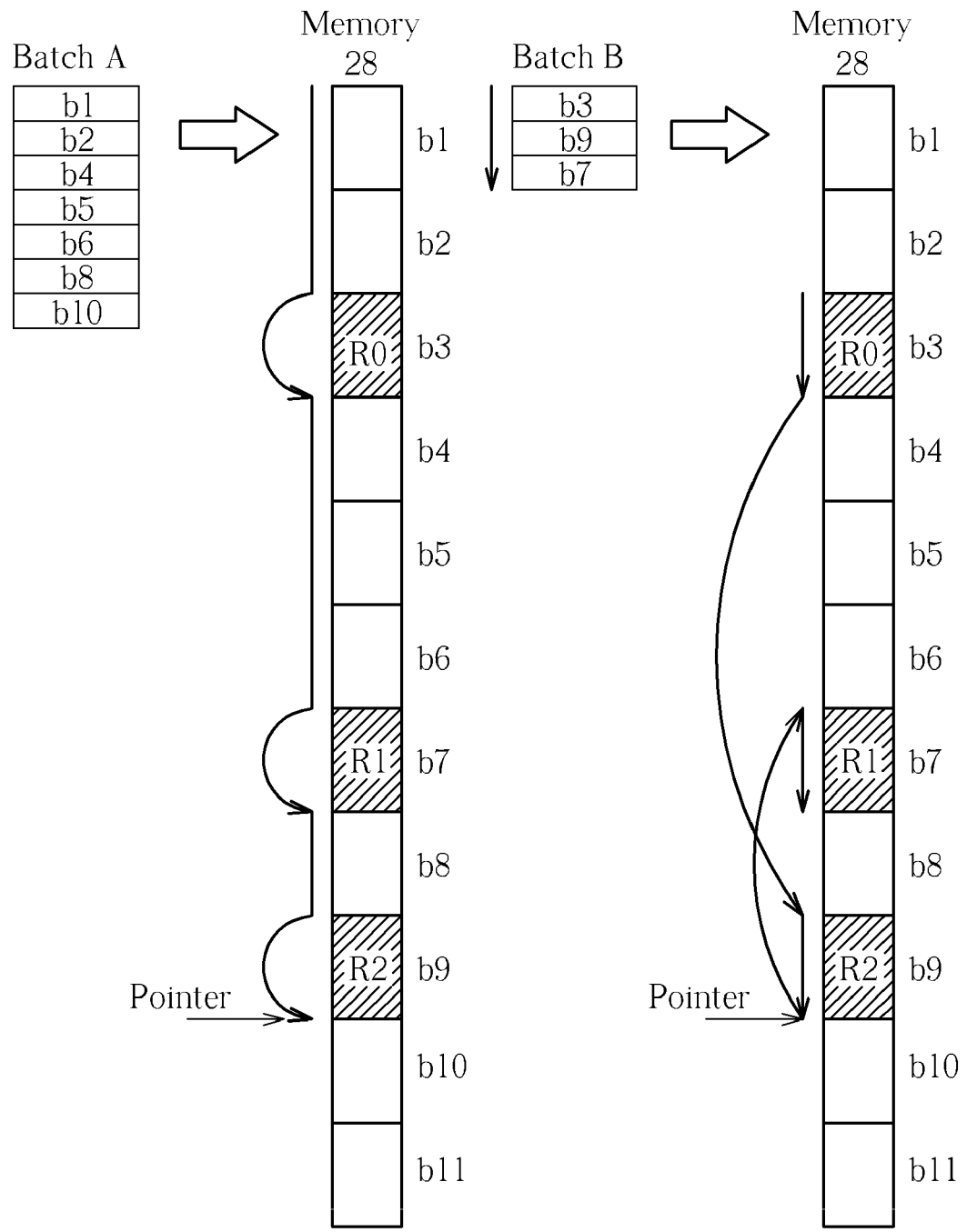
FIG. 9 is a schematic view of the method to randomly access the memory according to another embodiment of the invention.

Please refer to FIG. 6 and FIG. 9. FIG. 9 is a schematic view of the method to randomly access the memory 28 according to another embodiment of the invention. The destination address information of the data stored in successive blocks may not in sequence. In this embodiment of the invention, the controller 40 collects block indexes of those blocks storing data having sequential destination address information. Moreover, the controller 40 sorts the collected block indexes in sequence according to the destination address information of the data. And the controller 40 stores the sorted blocked index into the batch buffer 34 as a batch. As shown in FIG. 9, the data stored in memory 28 includes two sets of data. Each set of data has sequential destination address information. And each set of data has a corresponding batch (batch A and batch B) stored in the batch buffer 34. Thus when the optical disc drive 30 records the data to the optical disc 20, first of all, the batch controller 38 access the batch A stored in batch buffer 34, and the controller 40 controls the multiplexer 36 outputting the designated block indexes as the active index which respectively indicates a plurality of specific blocks of the memory 28 (i.e. blocks b1, b2, b4-b6, b8, and b10). According to the active index, the data stored in the specific blocks of the memory 28 are sequentially outputted as the read data to the encoder 22. Then, the batch controller 38 access the batch B stored in the batch buffer 34, and the controller 40 controls the multiplexer 36 outputting the designated block indexes as the active index which respectively indicates a plurality of specific blocks of the memory 28. According to the active index, the data stored in the specific blocks (i.e. blocks b3, b9 and then b7) of the memory 28 are sequentially outputted as the read data to the encoder 22.

Figure 10:
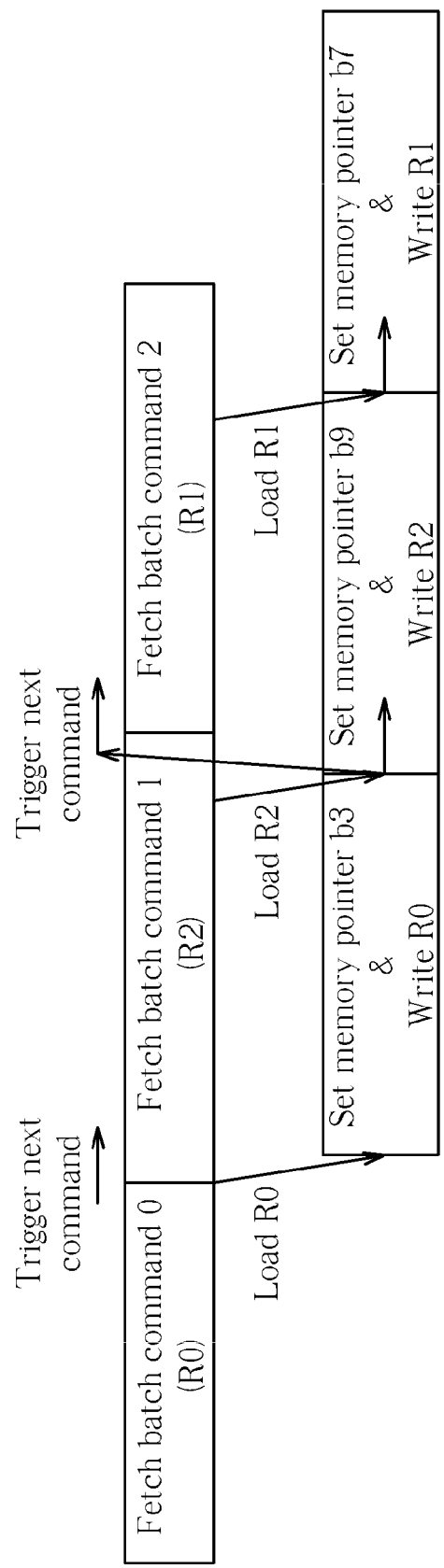
FIG. 10 and FIG. 11 are schematic views of the pointer of the memory in FIG. 9 controlled by the batch unit according to the invention.
Figure 11:
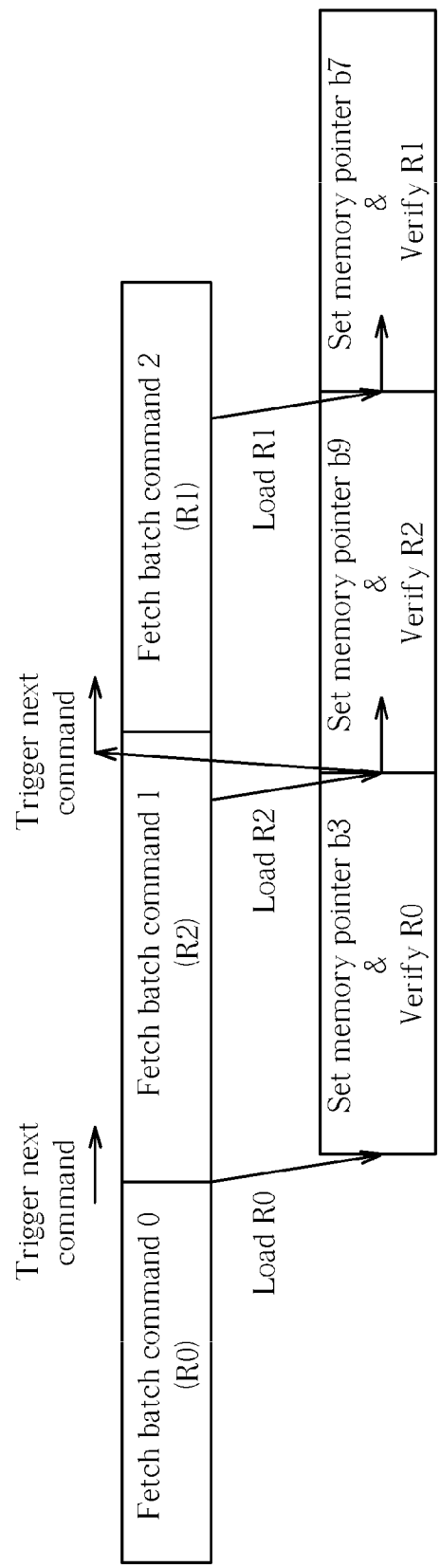

Please refer to FIG. 10 and FIG. 11. FIG. 10 and FIG. 11 are schematic views of the pointer of the memory 28 in FIG. 9 controlled by the batch unit 32 according to the invention. The batch unit 32 generates a sequence of batch commands to control the pointer of the memory 28. As shown in FIG. 10, first, the batch unit 32 fetches the batch command 0 to load the first block index (e.g. b3), so the pointer of the memory 28 is set to the first block. The data (R0) of the first block is written to the optical disc 20 and the next command is triggered. Then, the batch unit 32 fetches the batch command 1 to load the second block index (e.g. b9), so the pointer of the memory 28 is set to the second block. The data (R2) of the second block is written to the optical disc 20 and the next command is triggered. Finally, the batch unit 32 fetches the batch command 2 to load the third block index (e.g. b7), so the pointer of the memory 28 is set to the third block. The data (R1) of the third block are written to the optical disc 20. Thus, the batch unit 32 can fetch the batch command in sequence, and the data are written to the optical disc 20 according to the batch B.

Similarly, the data written to the optical disc 20 are verified according to the batch B. As shown in FIG. 11, firstly, the batch unit 32 fetches the batch command 0 to load the first block index (e.g. b3), so the pointer of the memory 28 is set to the first block. The recorded data are compared with the data (R0) of the first block and the next command is triggered. Then, the batch unit 32 fetches the batch command 1 to load the second block index, so the pointer of the memory 28 is set to the second block. The recorded data are compared with the data (R2) of the second block and the next command is triggered. Finally, the batch unit 32 fetches the batch command 2 to load the third block index, so the pointer of the memory 28 is set to the third block. The recorded data are compared with the data (R1) of the third block. According to the embodiment of the invention, the batch unit 32 utilizes the batch commands to control the pointer of the memory 28, so that the data stored in specific blocks indicated by the pointer according to the batch can be outputted.

In another embodiment of the invention, when the recorded data are read from the optical disc, the batch unit outputs the designated block index from the batch stored in the batch buffer to control the memory. Therefore, the recorded data read from the optical disc is stored into a specific block of the memory indicated by the designated block index.

Yet in another embodiment of the invention, when the data are encoded by the encoder, the batch unit outputs the designated block index from the batch stored in the batch buffer to control the memory. Therefore, the encoded data (e.g. PO code of DVD standard) could be stored into a specific block of the memory indicated by the designated block index.

In conclusion, the optical disc drive according to the invention utilizing the batch unit is able to randomly access blocks of the memory for storing data or reading data therein, so as to control the pickup head sequentially moving around the optical disc. Thus, the optical disc drive according to the invention can efficiently record, verify, and read the data of the optical disc with the defect management without the auxiliary buffer.

Those skilled in the art will readily observe that numerous modifications and alterations of the device and method may be made while retaining the teachings of the invention.

What is claimed is:

1. A method for accessing a memory, wherein the memory comprises a plurality of blocks, the method comprising:
   providing a batch, wherein the batch comprises a designated block index;
   generating a sequential block index;
   selectively outputting one of the sequential block index and the designated block index as an active index according to a control signal; and
   accessing a designated block of the memory according to the active index.

2. The method of claim 1, wherein data having sequential destination address information are sequentially stored in the successive blocks of the memory.

3. The method of claim 2, wherein the successive blocks of the memory are sequentially accessed according to the sequential block index so that the data stored in the memory are sequentially read out as a read data, and the read data are sequentially recorded onto an optical disc according to the destination address information.

4. The method of claim 2, wherein the data stored in the designated block is outputted from the memory as a read data, and the read data is recorded onto an optical disc by an optical disc drive.

5. The method of claim 4, wherein the method further comprising:
comparing the read data outputted from the memory with a recorded data read from the optical disc.

6. The method of claim 1, wherein the designated block of the memory is accessed according to the active block index so that a write data is stored into the designated block.

7. A control unit for accessing a memory, wherein the memory comprises a plurality of blocks, the control unit comprising:
a batch buffer for storing a batch, wherein the batch comprises a designated block index;
a batch controller for fetching the designated block index from the batch buffer; and
a multiplexer for selectively outputting one of a sequential block index and the designated block index as an active index according to a control signal;
wherein a designated block of the memory is accessed according to the active index.

8. The control unit of claim 7, wherein data having sequential destination address information are sequentially stored in the successive blocks of the memory.

9. The control unit of claim 8, wherein the successive blocks of the memory are sequentially accessed according to the sequential block index so that the data stored in the memory are sequentially read out as a read data, and the read data are sequentially recorded onto an optical disc according to the destination address information.

10. The control unit of claim 8, wherein the data stored in the designated block is outputted from the memory as a read data, and the read data is recorded onto an optical disc by an optical disc drive.

11. The control unit of claim 10 further comprising a comparator for comparing the read data outputted from the memory with a recorded data read from the optical disc.

12. The control unit of claim 7, wherein the designated block of the memory is accessed according to the active block index so that a write data is stored into the designated block.

13. The apparatus of claim 7, wherein the sequential block index is generated from a sequential block index generator.

14. An optical disc drive, comprising:
a batch unit for outputting one of a sequential block index and a designated block index as an active index;
a memory comprising a plurality of blocks for storing data therein, wherein a designated block of the memory is accessed according to the active index, and the data stored in the designated block is outputted as a read data;
a write signal generating unit for generating a write signal according to the read data; and
a pickup head, according to the write signal, recording the read data to an optical disc.

15. The optical disc drive of claim 14, the batch unit comprising:
a batch buffer for storing a batch, wherein the batch comprises the designated block index;
a batch controller for fetching the designated block index from the batch buffer; and
a multiplexer for selectively outputting the sequential block index or the designated block index as the active index according to a control signal.

16. The optical disc drive of claim 14, further comprising:
a comparator for comparing the read data outputted from the memory with a recorded data read from the optical disc.

17. An optical disc drive, comprising:
a pickup head for reading a recorded data from an optical disc to generate a modulated recorded data signal;
a recorded data generating unit for generating a recorded data according to the modulated recorded data signal;
a batch unit for outputting one of a sequential block index and a designated block index as an active index; and
a memory comprising a plurality of blocks for storing the recorded data into a designated block according to the active index.

18. The optical disc drive of claim 17, the batch unit comprising:
a batch buffer for storing a batch, wherein the batch comprises the designated block index;
a batch controller for fetching the designated block index from the batch buffer; and
a multiplexer for selectively outputting the sequential block index or the designated block index as the active index according to a control signal.

* * * * *